United States Patent [19]

Föhl

[11] Patent Number: 4,491,344

[45] Date of Patent: Jan. 1, 1985

[54] SAFETY BELT SYSTEM FOR MOTOR VEHICLES

[75] Inventor: Artur Föhl, Schorndorf, Fed. Rep. of Germany

[73] Assignee: REPA Feinstanzwerk GmbH, Aldorf, Fed. Rep. of Germany

[21] Appl. No.: 448,223

[22] Filed: Dec. 9, 1982

[30] Foreign Application Priority Data

Dec. 14, 1981 [DE] Fed. Rep. of Germany ....... 3149518

[51] Int. Cl.³ ...................... A62B 35/02; B60R 21/10
[52] U.S. Cl. ..................................... 280/808; 297/483
[58] Field of Search .............. 280/801, 802, 804, 808; 297/468, 473, 483, 486

[56] References Cited

U.S. PATENT DOCUMENTS

4,056,282 11/1977 Nordh ................................. 297/483
4,070,040 1/1978 Igeta ................................... 280/804
4,220,355 9/1980 Henderson et al. ................. 280/804
4,343,489 8/1982 Suzuki et al. ....................... 280/804

Primary Examiner—David M. Mitchell
Assistant Examiner—Kenneth R. Rice
Attorney, Agent, or Firm—Yount & Tarolli

[57] ABSTRACT

Safety belt system for motor vehicles, with a support point for the belt trap provided above the shoulder of the vehicle passenger to be protected, in the form of an end or deflection fitting which can be fastened at different heights in the vehicle, preferably to the central column thereof, for adaptation to the size of the body of the vehicle passenger. A substantially vertical anchor track is firmly fastened to a central column of the vehicle. The fitting is guided in the track so as to be longitudinally movable. For fixing the fitting at the desired height, a moving slider is likewise supported so that it can be moved lengthwise and locked.

15 Claims, 11 Drawing Figures

SAFETY BELT SYSTEM FOR MOTOR VEHICLES

BACKGROUND OF THE INVENTION

1. Field of the Invention

This invention relates to a safety belt system for motor vehicles, with a support point for a belt strap above the shoulder of a vehicle passenger to be protected, in the form of an end or deflection fitting which can be fastened at different heights in the vehicle, preferably to a central column of the vehicle, for adaptation to the size of the body of the vehicle passenger.

2. Description of the Prior Art

In such safety belt systems it is known to make the support point provided for the belt strap adjustable in height in accordance with the size of the vehicle passenger to be protected. In order to obtain maximum protection for the vehicle passenger, it is necessary to move the support point down for small persons and up for taller persons. To make such adaptation in height possible, it is customary to provide, for instance, in the middle column of the motor vehicle, at which the deflection fitting of a system with an automatic winding-up device or the end fitting of a static system of a passive belt system can be fastened, tapped holes at different heights to selectively fasten the fitting at different heights. Naturally, moving the fitting here is very laborious and can be done only by skilled specialists.

SUMMARY OF THE INVENTION

An object of the invention is to provide a safety belt system with a support point for the belt strap above the shoulder of a passenger, in which the support point for the belt can be changed in height with one manipulation by the vehicle passenger himself. This system is suitable for all belt systems (passive system, static system, roll-up system).

With the foregoing and other objects in view, there is provided in accordance with the invention a safety belt system for motor vehicles comprising a belt strap for securing a passenger of the vehicle to be protected, a support point in the vehicle for the belt strap, above the shoulder of the vehicle passenger to be protected, in the form of an end or deflection fitting which can be fastened at different heights in the vehicle for adaptation to the size of the body of the vehicle passenger, the combination therewith of a substantially vertical anchor track firmly fastened to the vehicle, said fitting guided and movable longitudinally in the track, a longitudinally movable slider supported by the track and provided with locking means for detaining the fitting at the desired height.

Other features which are considered as characteristic for the invention are set forth in the appended claims. Although the invention is illustrated and described herein as embodied in safety belt system for motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

In accordance with the invention, a substantially vertical anchor track is firmly fastened to a central column of the vehicle. A fitting is guided in the track and movable longitudinally. A moving slider supported on the track can be locked to fix the fitting at the desired height. In the safety belt system according to the invention, the vehicle passenger can himself loosen the movable slider from the rest position, move it along the anchor bar to the desired height and lock it there again. This is facilitated particularly by the feature that the movable slider can be tilted transversely to the direction of movement preferably against the force of a spring; can be detented in the rest position by detent elements along the slide track; and can be disengaged by tilting. The new support point for the belt strap is fixed either because the fitting is coupled to the movable slider and is therefore taken along during the sliding motion or because, for instance, by the upper edge of the movable slider, a support stop at another height is created. Adapting to the different belt system is possible in a simple manner by, for instance, inserting a fitting into the anchor track which is provided on the outside with a locking opening for the belt end instead of using a fitting with a deflecting surface on the outside.

A very simple mechanical design of the safety belt system is obtained by the embodiment in which the anchor track 1, preferably designed as an extruded or drawn part, has an anchor profile 2 which is continuous in its longitudinal direction, with a largely circular cross section for the tiltable support of the movable slider which encircles the anchor track in part. The track is traversed by a core opening 7 and a longitudinal slot 8 which starts at the core opening and is open toward the outside, for supporting and guiding the fitting 9. The anchor track has, due to its shape which allows mass production by an extruding or drawing process, two functions, namely, a function as a form-stable abutment for the fitting which can withstand any mechanical stress in the event of a crash, and the further function as a guide and tilting axis for the movable slider.

According to a further embodiment of the invention, the anchor track has a preferably L-shaped, bent-off mounting flange, by which it is fastened to the vehicle, for instance, at the center column. By changing the angle between the mounting flange and the anchor track and therefore, between the mounting flange and the core opening/longitudinal slot, the setting angle of the fitting and thereby, of the belt strap can be fitted optimally to the body of the vehicle passenger to be protected.

The safety belt system according to the invention is particularly well suited for a combination with passive belt systems. The anchor track is inserted into the path of motion for the end fitting and therefore represents part of this path of motion. With such a passive belt principle, in order to obtain a change in height of the support point for the belt and at the same time a suitable adaptation for the motor drive system, a dragged part is provided which contains the electric switch for the drive motor and automatically moves along with the movable slider. As a result, the switch is always in the correct position relative to the newly chosen support point. Further advantageous details of the invention may be seen from the embodiment examples which are shown in the drawing and will be described in the following.

Figure 1:
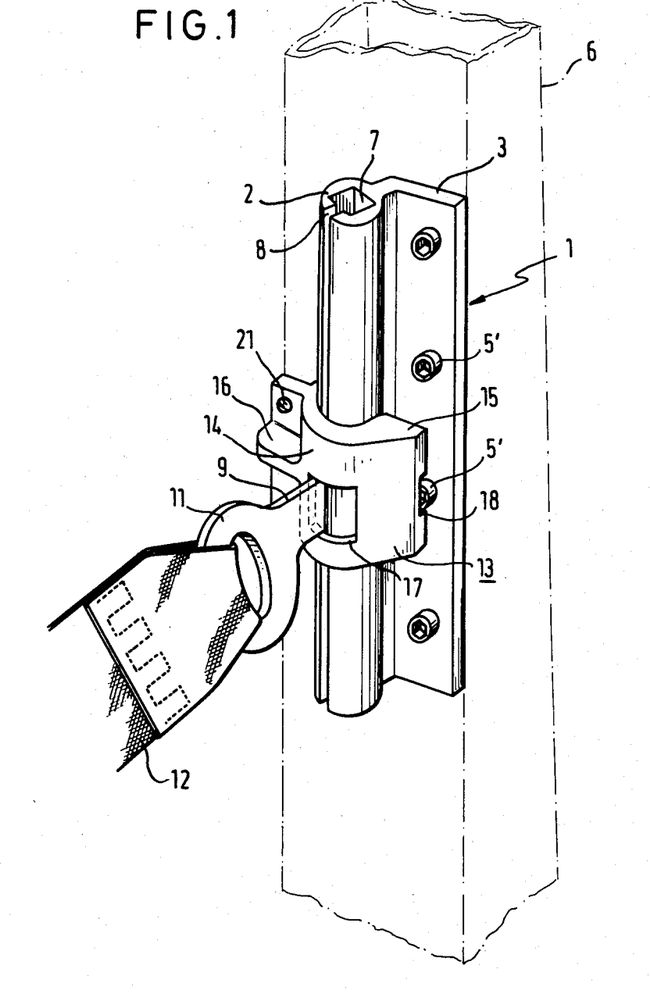
FIG. 1 is a perspective view of a first embodiment of the safety belt system according to the invention, suitable for a static and passive belt system.
Figures 2, 3:
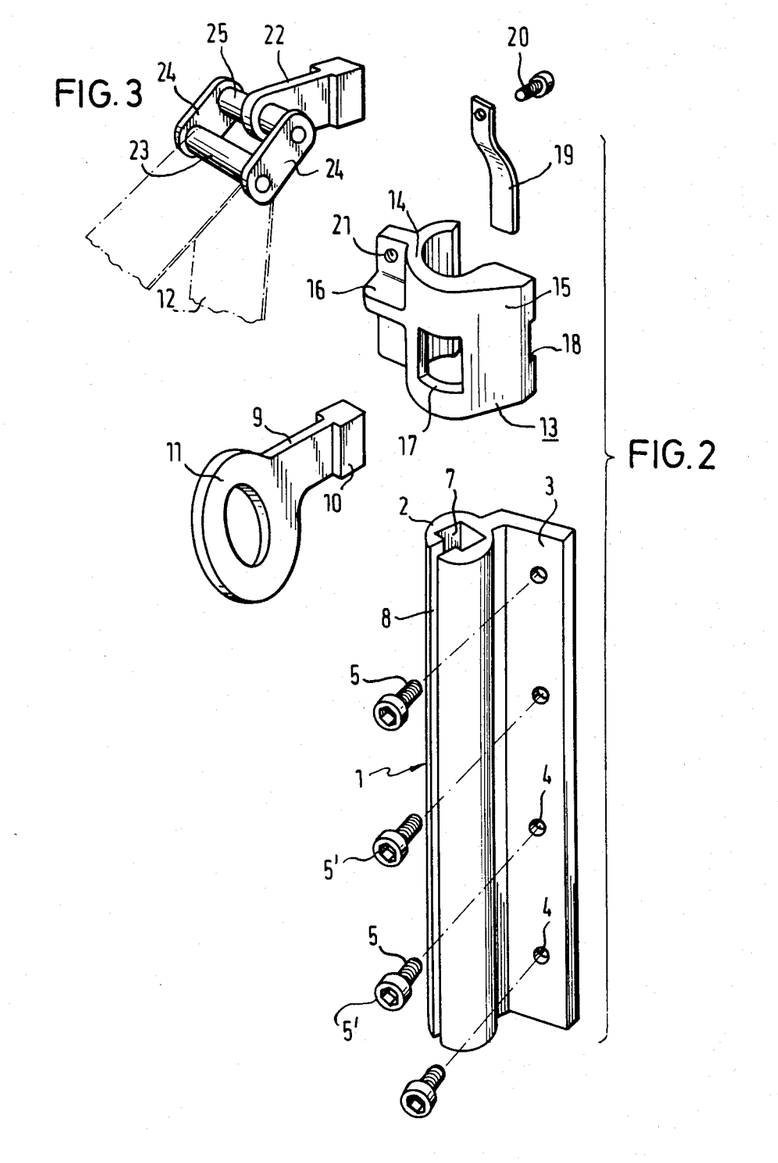
FIG. 2 shows the safety belt system according to FIG. 1 in an exploded view.
FIG. 3 is a variant of a fitting in the form of a deflection fitting for a belt system with an automatic roll-up device.
Figure 4:
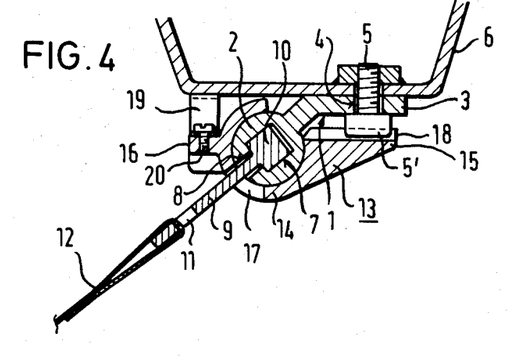
FIG. 4 is a cross-sectional view of the safety belt system according to FIGS 1 and 2.

In the embodiment example according to FIGS. 1, 2 and 4, an elongated anchor track 1 which is designed as an extruded or drawn part, has a substantially L-shape. This anchor track 1 consists of an anchor shape 2 which is continuous in the lengthwise direction with a largely circular cross section and an angularly bent-off mounting flange 3, in which four openings 4 are provided. As FIG. 1 illustrates, the anchor track 1 is fastened, by means of screws 5 with screw heads 5', to a center column 6, indicated by dash-dotted lines, of a motor vehicle. The metallic round anchor profile 2 is centrally traversed by a substantially square core opening 7, which is adjoined by a likewise continuous longitudinal slot 8 which is open to the outside. Guided with slight play in the core opening 7, movably lengthwise, is a fitting 9 which has a hammer-head-like extension 10 and a belt eye 11, to which the free end of a safety belt strap 12 is fastened or sewed. A movable slider 13 is made, for instance, of light metal and consists of a partly sleeve-like section 14 of circular profile, a substantially radial detent extension 15 and a handle 16 which extends substantially radially beyond the section 14. The moving slider 13 has a window-like breakthrough 17, in which the fitting 9 is brought to the outside and is coupled, as shown in FIGS. 1 and 4, to the moving slider 13 such that simultaneously with moving the moving slider 13, the fitting is moved. The window-like breakthrough 17 is wide enought that, with the fitting 9 stationary, the moving slider 13 can be tilted about the anchor profile axis by a predetermined amount. The detent extension 15 of the moving slider 13 has a detent slot 18, by which the moving slider 13 can be detented at one of the screw heads 5', as shown in FIGS. 1 and 4. In this detent position, the moving slider is held by a spring element 19 which is fastened by means of a screw 20 to a tapped hole 21 of the moving slider 13 and is braced resiliently against the central column 6. By pressing the handle 16, the movable slider 13 is tilted, whereby the detent connection between the detent slot 18 and the screw head 5' is disengaged. The movable slider 13, together with the fitting 9 can then be set in height and can again be detented at another screw head 5' above or below. The fitting 9 automatically follows the shifting motion of the movable slider 13. In the detent position, the fitting 9 with the hammer-head-like extension 10 can safely take up the forces acting on the safety belt strap 12.

Figure 5:
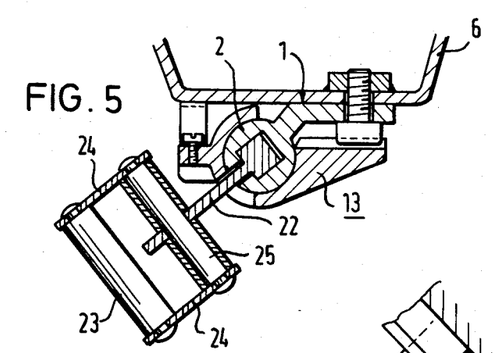
FIGS. 5 and 5a show two different sectional views of the safety belt system according to FIGS. 1 and 2 with the fitting according to FIG. 3.
Figure 5A:
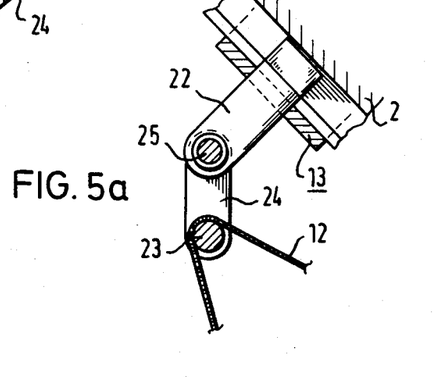

In the embodiment example according to FIG. 3, a fitting 22 with a hammer-head-like extension has a round deflection part 23 for the safety belt 12. This deflection part 23 is riveted together with lateral straps 24 which are in turn connected to a bearing pin 25. Preferably, this bearing pin 25 is pivoted in the fitting 22. In FIGS. 5 and 5a, this design of the fitting 22 with a hinged deflection part 23 is further illustrated in two mutually perpendicular views.

In the embodiment examples shown, the handle 16 is arranged in the respective travel direction of the vehicle. However, provision can be made for the detent elements on the actuating side and to arrange the handle 16 on the opposite side.

Figure 6:
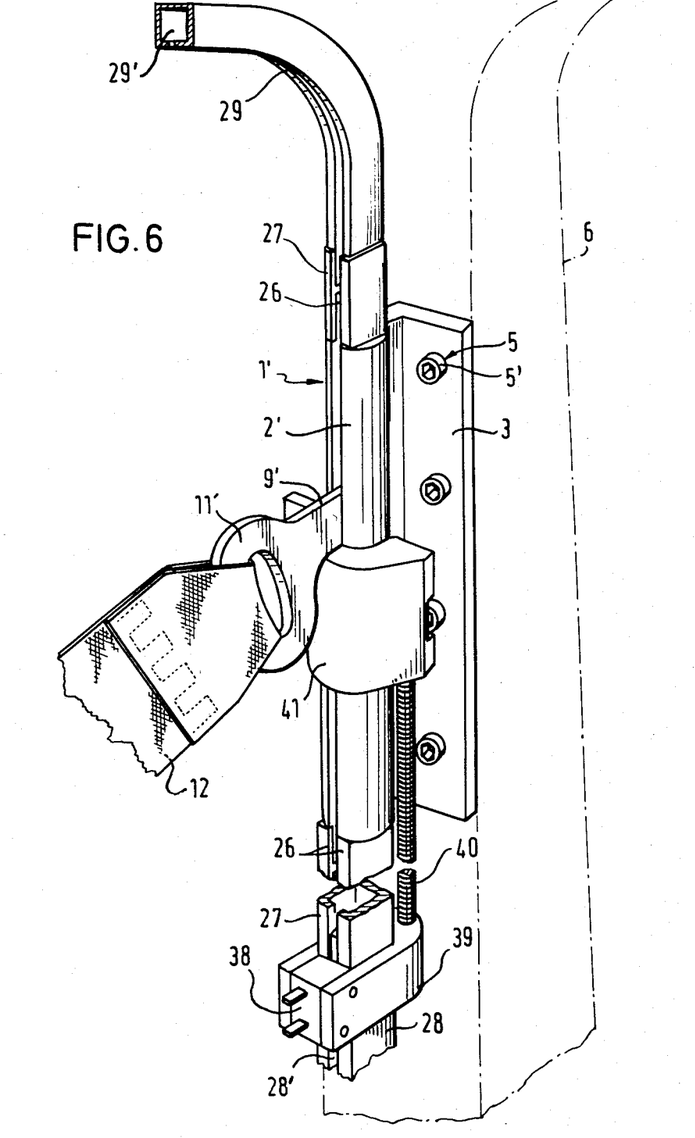
FIGS. 6 and 7 show a perspective view and a lateral sectional view of a further embodiment of the safety belt system according to the invention, suitable for a passive belt system.
Figure 7:
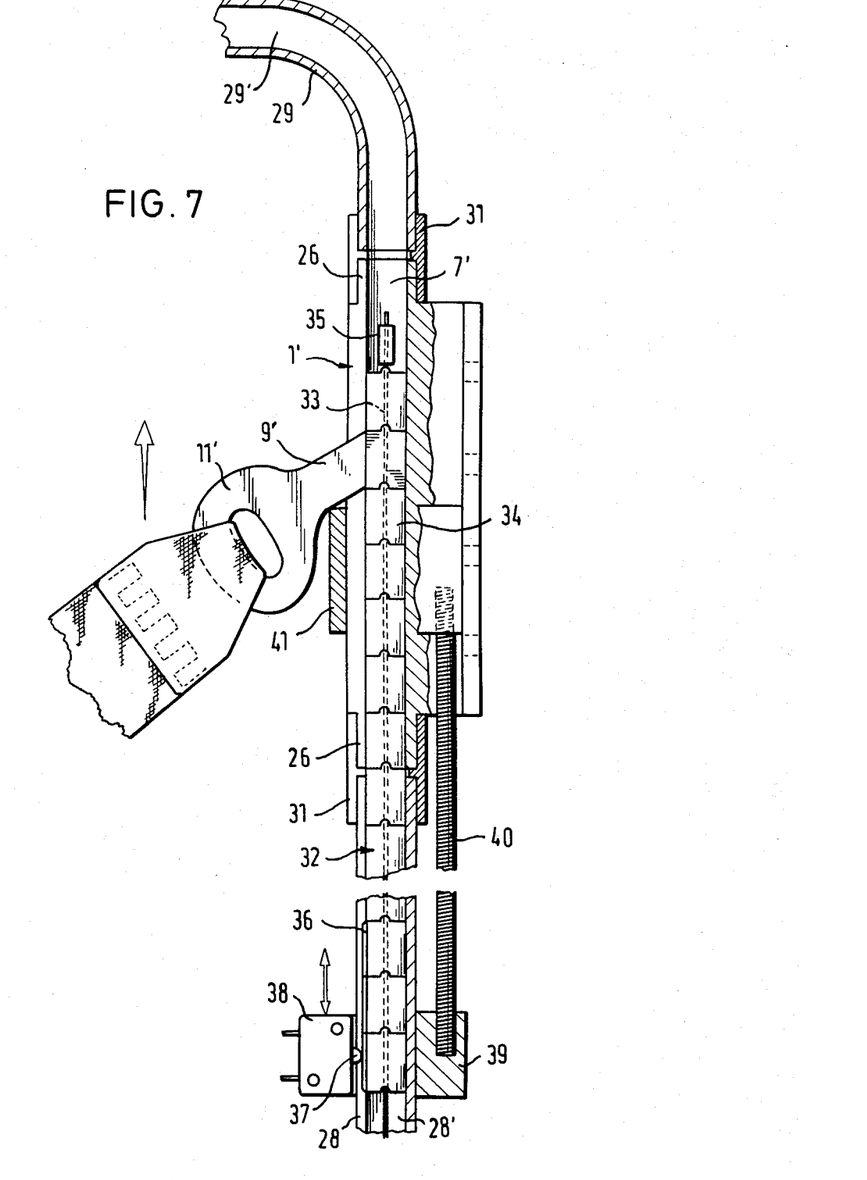

In the embodiment example according to FIGS. 6 and 7, part of a safety belt system according to the passive-belt principle is illustrated. Here, an elongated anchor track designated with 1' has a round anchor profile 2' and a bent-off mounting flange 3'. The anchor track 1' is fastened, by means of screws 5 having screwheads 5', to the central column 6 of a motor vehicle. The anchor track 1' is designed like the anchor track in the previous embodiment example, except that at the two free ends of the anchor track 1', coupling parts 26 are further provided or formed-on, onto which guide tracks 28 and 29 having corresponding mating coupling parts 27 can be plugged. The guide tracks 28 and 29 have continuous guide openings 28' and 29' which have substantially the same cross section as the core opening 7' of the anchor track 1'. As shown in FIG. 7, connecting sleeves 31 are provided for coupling the anchor track 1' to the guide tracks 28 and 29. Therewith, the anchor track 1' with its continuous core opening 7' represents part of a long path of motion for the shifting motion of an end fitting 9' which is of a design similar to the fitting 9 according to FIG. 1, except that the belt eye 11' for the end of the belt strap is slightly angled-off downward. The upper guide track 29 may extend above the front door of the motor vehicle. The end fitting 9' which is coupled to flexible or bendable pushing and pulling means 32, can be moved longitudinally along the path of motion in the guide slots 28', 29' and in the core opening 7'. The pushing and pulling means 32 consist of a cable core 33, onto which sleeve-like elements 34 are slipped, where the elements 34 slipped onto the cable core 33 are fixed in their position by a clamp 35. The link-like pushing and pulling means 32 are connected to an electric drive motor, not specifically shown, and can be driven by this drive motor in both directions. As already mentioned, the end fitting 9' which is provided in its hammer-head-like extension with a lead-through opening, is likewise threaded onto the steel core 33 and thereby connected to the pushing and pulling means 32. Some of the sleeve-like sliding elements 34 are provided with control dogs 36 which serve for actuating the switch plunger 37 of an electric switch 38. The electric switch 38 is mounted in a dragged part 39 which is supported at the guide track 28 so as to be movable lengthwise, as indicated by arrows. By means of flexible pulling and pushing means 40, the setting slider 41 is connected to the dragged part 39. The setting slider 41 is similar in construction to the setting slider 13 in accordance with the previous embodiment example, except that it has no window-like breakthrough 17 (as per FIG. 1). The end fitting 9' rather bears against the upper edge of the setting slider 41. The electric switch 38 serves to switch the electric drive motor on and off when putting-on and taking-off the safety belt, and specifically, in a predetermined position of the end fitting 9'. By the connection of the height-adjustable setting slider 41 to the dragged pat 39 via the pushing and pulling means 40, the position of the electric switch 38 and its switch plunger 37 can follow the setting position of the setting slider 41. Upon a shift in height of the setting slider 41 and thereby, the position of the end fitting 9', the position of the electric switch 38 is automatically changed or adapted to the new position of the setting slider 41, so that the drive motor is always switched on and off in the correct position.

Figure 8:
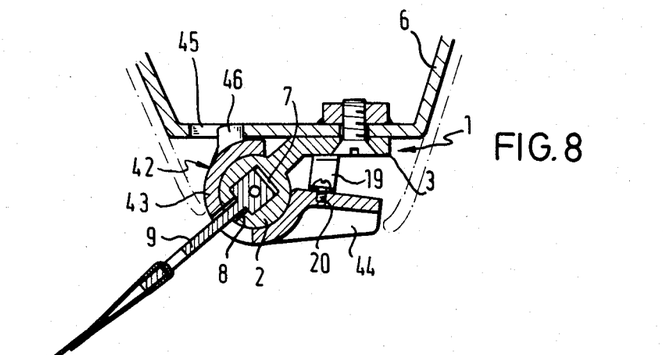
FIGS. 8, 9 and 10 illustrate an embodiment of the safety belt system according to the invention, suitable for all types of systems.
Figures 9, 10:
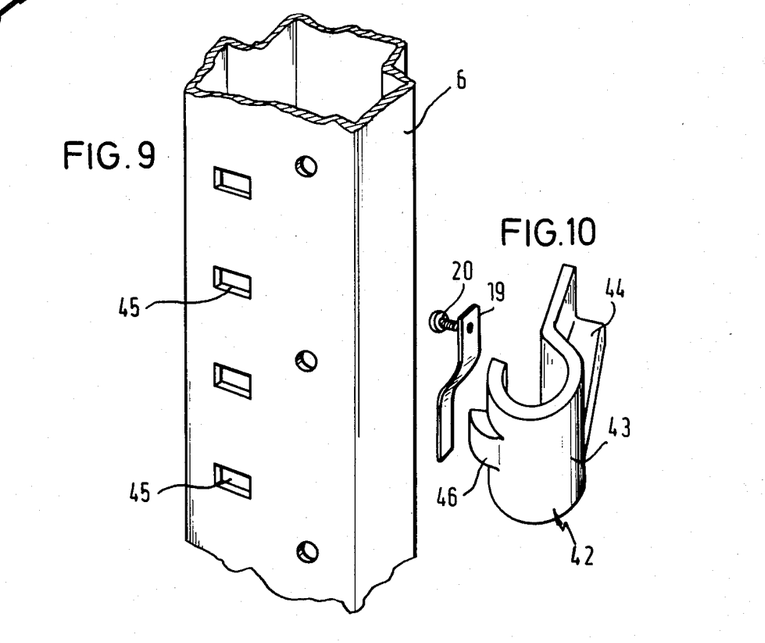

FIGS. 8, 9 and 10 show an alternative to the embodiment example according to the preceding figures. An anchor track 1 with a round anchor profile 2 and mounting flange 3 is again provided here, identically to FIG. 3. In the core opening 7 and in the longitudinally slot 8, a fitting 9 is again supported movably. The anchor track 1 is fastened by means of countersunk screws to the central column 6 of the motor vehicle. In this embodiment example, the detent means serving for detenting the movable slider 42 are modified from FIG. 1. The sleeve-like section 43 of slider 42 has a substantially radial handle 44, at the column-side boundary. The spring element 19, braced with pretension against the mounting flange 3, is fastened by means of a screw 20. On the opposite side of the sleeve-like section 43 is formed a likewise substantially radial detent projection 46 which engages in the detent position according to FIG. 8, in one of several detent openings 45 worked into the central column 6, whereby the desired height position of the movable slider 42 is again fixed. By pressing down the handle 44, the moving slider 42 can be tilted about the axis of the anchor profile 2. This causes the detent projection 46 to leave the proximity of the detent position 45 and permits the movable slider 42 to be moved along the anchor track 1.

I claim:

1. Safety belt system for motor vehicles comprising a belt strap fo securing a passenger of the vehicle to be protected, a support point in the vehicle for the belt strap, above the shoulder of the vehicle passenger to be protected, in the form of a fitting which can be fastened at different heights in the vehicle for adaptation to the size of the body of the vehicle passenger, the combination therewith of a substantially vertical anchor track firmly fastened to the vehicle, said fitting guided and movable longitudinally along the track, a longitudinally movable slider supported by the track and provided with locking means for detaining the fitting at the desired height, the movable slider support at the anchor track being tiltable transversely to the moving direction, a spring urging the slider to the utilized position which is the normal rest position, the locking means including detent elements along the track which engage the movable slider at rest position, and which detent elements are disengaged by tilting to permit moving the slider to a different height.

2. Safety belt system according to claim 1, wherein the vertical anchor track is firmly fastened to a central column of the vehicle.

3. Safety belt system according to claim 1, wherein the fitting is braced against the top edge of the movable slider.

4. Safety belt system according to claim 1, wherein the anchor track has an anchor profile which is continuous in its longitudinal direction, with a large circular cross section for the tiltable support of the movable slider which encircles the anchor track in part, said anchor track being traversed by a core opening and a longitudinal slot which starts at the core opening and is open toward the outside, for supporting and guiding the fitting.

5. Safety belt system according to claim 4, wherein the fitting is supported in the core opening by a hammer-head-like extension of recatangular cross section.

6. Safety belt system according to claim 5, wherein the section of the movable slider encircling the round anchor profile has a window-like breakthrough through which the fitting is brought through and coupled to the movable slider.

7. Safety belt system according to claim 1, wherein the anchor track has a mounting flange by which it is fastened to the vehicle.

8. Safety belt system according to claim 7 wherein the mounting flange relative the anchor track is bent-off in L-shape, and wherein the angle of the L between the mounting flange and the anchor track is adapted to the body of the vehicle passenger to be protected.

9. Safety belt system for motor vehicles comprising a belt strap for securing a passenger of the vehicle to be protected, a support point in the vehicle for the belt strap, above the shoulder of the vehicle passenger to be protected, in the form of a fitting which can be fastened at different heights in the vehicle for adaptation to the size of the body of the vehicle passenger, the combination therewith of a substantially vertical anchor track firmly fastened to the vehicle, said fitting guided and movable longitudinally along the track, a longitudinally movable slider supported by the track and provided with locking means for detaining the fitting at the desired height, the anchor track having a mounting flange by which it is fastened to the vehicle, fastening means with heads such as screw or rivet heads aligned with each other with spacing on the mounting flange in the longitudinal direction of the track and wherein the movable slider can be detented by said heads.

10. Safety belt system for motor vehicles comprising a belt strap for securing a passenger of the vehicle to be protected, a support point in the vehicle for the belt strap, above the shoulder of the vehicle passenger to be protected, in the form of a fitting which can be fastened at different heights in the vehicle for adaptation to the size of the body of the vehicle passenger, the combination therewith of a substantially vertical anchor track firmly fastened to the vehicle, said fitting guided and movable longitudinally along the track, a longitudinally movable slider supported by the track and provided with locking means for detaining the fitting at the desired height, the movable slider having a detent projection which can engage a series of detent openings in the vehicle body located in alignment with each other.

11. Safety belt system for motor vehicles comprising a belt strap for securing a passenger of the vehicle to be protected, a support point in the vehicle for the belt strap, above the shoulder of the vehicle passenger to be protected, in the form of a fitting which can be fastened at different heights in the vehicle for adaptation to the size of the body of the vehicle passenger, the combination therewith of a substantially vertical anchor track firmly fastened to the vehicle, said fitting guided and movable longitudinally along the track, a longitudinally movable slider supported by the track and provided with locking means for detaining the fitting at the desired height, the fitting is an end fitting which has a long path of motion for moving an end fitting, along which the end fitting can be moved via motor-driven pushing and pulling means, wherein the anchor track is inserted into the path of motion, and is connected by means of coupler parts to guide tracks forming the path of motion, and wherein the movable slider is connected via a flexible pulling and pushing means to a dragged part movable along the path of motion, and wherein an electric switch which serves for actuating the drive motor is arranged along the path of motion and can be switched on and off by the pulling and pushing means connected to the end fitting.

12. An apparatus for use in connecting a safety belt with a vehicle and adjusting the position of one end portion of the safety belt relative to the vehicle, said apparatus comprising a longitudinally extending track, fitting means for connecting the one end portion of the safety belt with said track, said fitting means being movable along said track to vary the position of the one end portion of the safety belt relative to said track, slider means movable to any one of a plurality of positions along said track for blocking movement of said fitting means past a selected location along said track, said slider means including surface means engageable with said fitting means to block movement of fitting means in at least one direction along said track, and detent means for holding said slider means in a selected one of the plurality of positions along said track, said detent means including a plurality of spaced apart stationary detent surfaces disposed in a longitudinally extending array along said track with the longitudinal axis of the array of detent surfaces extending parallel to the central axis of said track and movable detent surface means connected with said slider means for engaging said stationary detent surfaces, said slider means being movable along said track to enable said movable detent surface means to engage a selected one of said stationary detent surfaces, said slider means being pivotal about said track between an engaged condition in which said movable detent surface means engages one of said stationary detent surfaces to hold said slider means against movement along said track and a release condition in which said movable detent surface means is spaced from said stationary detent surfaces, and spring means for urging said slider means to pivot about said track from the release condition to the engaged condition, said slider means being pivotal against the influence to said spring means from the engaged condition to the release condition under the influence of force applied against said slider means.

13. An apparatus as set forth in claim 12 wherein said track has an arcuate outer side surface, said slider means having an arcuate inner side surface which is disposed in abutting engagement with the arcuate outer side surface of said track means, said slider means being pivotal about the center of curvature of the arcuate outer side surface of said track means to move said slider means between the engaged and disengaged conditions.

14. An apparatus as set forth in claim 13 wherein said track includes longitudinally extending first surface means for defining a passage which extends longitudinally along the inside of said track and longitudinally extending second surface means which extends between the passage and the arcuate outer side surface of said track to at least partially define a slot through which said fitting means extends, said fitting means having surface means disposed in abutting engagement with said first surface means to enable force to be transmitted from said fitting means to said track upon the application of force to said fitting means by the one end portion of the safety belt.

15. An apparatus as set forth in claim 12 wherein said stationary detent surfaces are disposed along one side of said track and said spring means is disposed on a side of said track opposite from said one side.

* * * * *

UNITED STATES PATENT AND TRADEMARK OFFICE
CERTIFICATE OF CORRECTION

PATENT NO. : 4,491,344
DATED : January 1, 1985
INVENTOR(S) : Artur Fohl

It is certified that error appears in the above-identified patent and that said Letters Patent is hereby corrected as shown below:

Column 5, line 40, change "fo" to -- for --;

line 51, change "support" to -- supported --;

line 67, change "large" to -- largely --.

Signed and Sealed this

Twenty-seventh Day of August 1985

[SEAL]

Attest:

DONALD J. QUIGG

Attesting Officer

Acting Commissioner of Patents and Trademarks